United States Patent [19]

Bauer et al.

[11] 4,060,261
[45] Nov. 29, 1977

[54] LOADER MAIN FRAME FOR SKID STEER LOADER

[75] Inventors: James J. Bauer, Lisbon; Thomas M. Sagaser, Gwinner, both of N. Dak.

[73] Assignee: Clark Equipment Company, Buchanan, Mich.

[21] Appl. No.: 654,262

[22] Filed: Feb. 2, 1976

[51] Int. Cl.² .............................................. B60R 21/02
[52] U.S. Cl. ............................ 280/756; 214/DIG. 7; 296/102
[58] Field of Search .............. 280/756; 296/102, 28 C; D12/57; 214/DIG. 7

[56] References Cited

U.S. PATENT DOCUMENTS

| D. 224,588 | 8/1972 | Bauer | D12/57 |
|---|---|---|---|
| 3,632,134 | 1/1972 | Babbitt, Jr. et al. | 296/102 X |
| 3,785,696 | 1/1974 | Moore et al. | 296/102 |
| 3,841,430 | 10/1974 | Babbitt, Jr. et al. | 296/102 X |
| 3,866,942 | 2/1975 | Dobeus et al. | 296/102 X |
| 3,990,738 | 11/1976 | Kolinger et al. | 296/102 X |

Primary Examiner—Joseph F. Peters, Jr.
Assistant Examiner—Michael J. Forman
Attorney, Agent, or Firm—Harry G. Thibault

[57] ABSTRACT

A skid steer loader comprising an improved loader main frame and including an operator's compartment designed to present a low profile vehicle particularly suitable for low clearance applications. The loader main frame includes a center compartment partially defined by a pair of longitudinally extending, laterally spaced side beams. The engine for the vehicle is mounted at the rear of the center compartment and is acoustically enclosed by structural elements of the frame. A seat pan mounted on the side beams overlies the engine and transmission and separates the operator compartment from the center compartment. At a forward end of the center compartment an elongated transmission case forms a partial bottom wall and also encloses the chain and sprocket drive system of the vehicle. The side walls of the transmission case are displaced from the side walls of the frame, enabling the operator to straddle the case, thus reducing height requirements for both the operator compartment and the overall vehicle. Uprights secured to the side beams of the main frame at respective outer rear portions thereof partially enclose the rear portion of the center compartment and boom loader arms are secured to upper pivotal mountings provided on the uprights. Respective front ends of the loader arms are arcuately proportioned to extend forward of the wheels of the vehicle. An improved attachment mounting means incorporating a single mid-plane cylinder is provided between respective outer ends of the loader arms, the loader arms also carrying attachment means for implements used with the vehicle. A low profile overhead guard specially fabricated encloses the operator compartment and completes the assembly.

2 Claims, 15 Drawing Figures

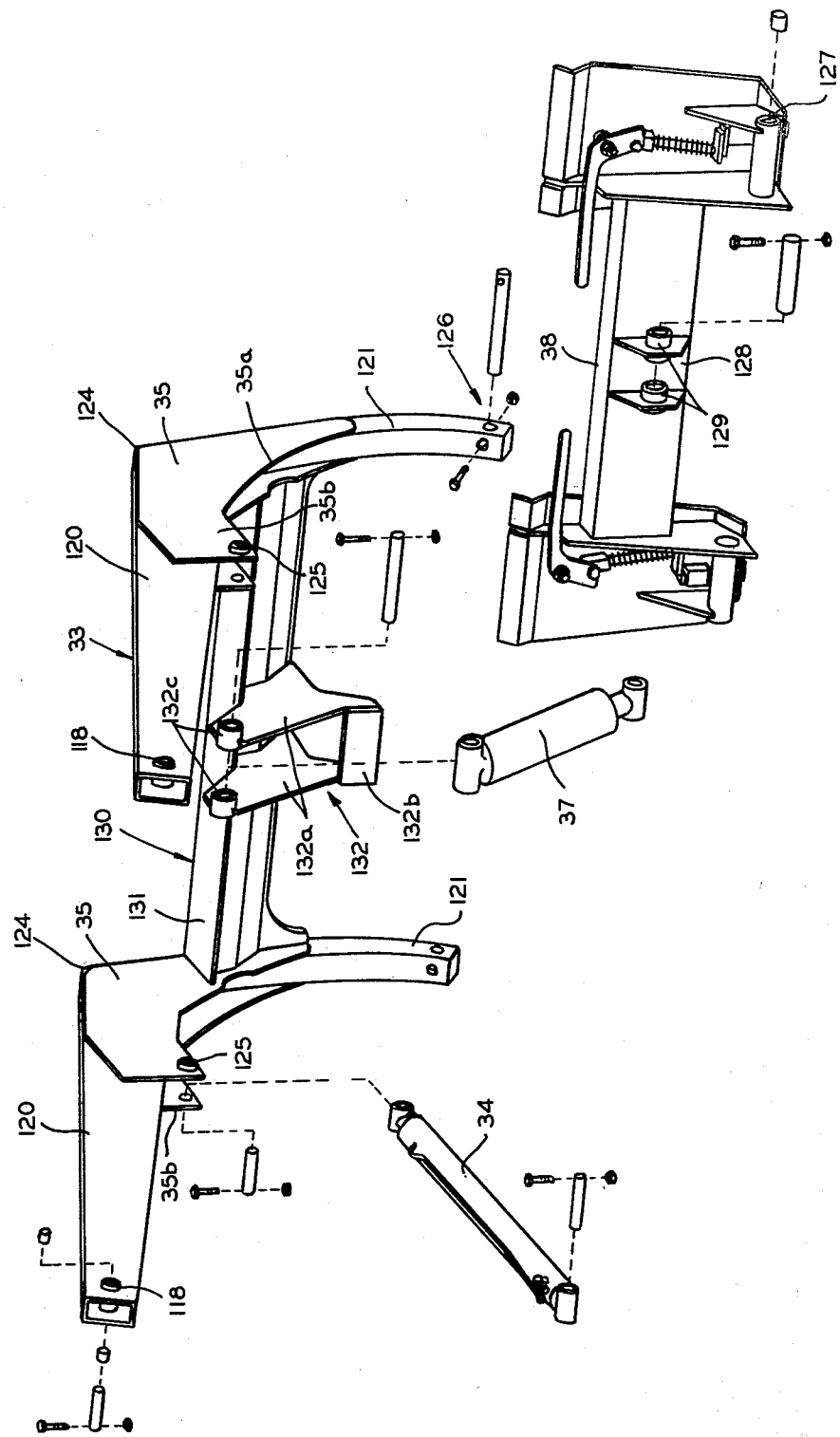

LOADER MAIN FRAME FOR SKID STEER LOADER

FIELD OF THE INVENTION

This invention pertains to the art of skid steer loaders and more particularly to a main frame for an improved loader adapted to provide an improved operator's module and to incorporate a low profile particularly suitable for low clearance applications.

BACKGROUND OF THE INVENTION

Skid steer loaders are vehicles possessing a high degree of maneuverability which are propelled and maneuvered by driving the wheels on one side of the vehicle at a different speed and/or in a different direction from those on the other side of the vehicle so as to achieve a turning motion. In the case where the wheels on one side are driven forwardly and those on the opposite side reversely, the loader will turn on its axis or, in other words, spin in its tracks. However, the operator's compartment of such vehicles are typically constricted, with the operator surrounded by the working elements of his machine and buffered by engine and transmission noise.

Typically, the skid steer loader's high levels of maneuverability are put to best use in operations wherein the loader's steering abilities easily enable it to negotiate around obstacles such as struts, columns and supports encountered in an enclosed environment and used to support the structure in which the loader is working. However, in many instances, particularly in agricultural applications, the requirements of the job include a necessity for a machine which has the ability to work under conditions of low clearance as well as conditions requiring high maneuverability. Such low clearance applications requiring a low profile vehicle suggest a further encroachment of the operator's space. Further, the necessity of providing a protective enclosure for the machine operator has heretofore limited the low clearance capability of such skid steer loaders. Heretofore low vehicle clearance has been achieved only at a sacrifice in load capability and power, and with additional encroachment on the operator's compartment.

DESCRIPTION OF THE PRIOR ART

The prior art vehicles generally present an upright box-like structure of uniform body width wherein all structural members are located inside the inner face of the wheels mounted on the vehicle. A skid steered loader hve such a body construction and employing a hydrostatic drive comprising two independent variable speed transmissions, one mounted on each side for driving their respective sets of wheels, is disclosed in U.S. Pat. No. 3,635,365 entitled "Tractor Vehicle with Hydrostatic Drive Means" by James J. Bauer which issued Jan. 18, 1972 to the assignee of the present invention. The design of that vehicle is also the subject of U.S. Pat. No. 224,588 entitled "Self-Propelled Loader Vehicle" by the same inventor, issued Aug. 8, 1972 also assigned to the assignee of the present invention.

Efforts to improve the mobility of a skid steer loader vehicle also involved body design. For example, it is known that a skid steer loader should preferably have a wheel base shorter than the center-to-center distance between the wheels on opposite sides of the loader to reduce tire wear and resistance to skid turns. Further, proper weight distribution in a skid steer vehicle improves mobility. Thus the engine is located in the rear and partially counterweights the loader bucket in front. An earlier attempt to change the body design of the vehicle is disclosed in U.S. Pat. No. 3,895,728 entitled "Tractor Vehicle Having Material Handling Subframe" by John P. Heggen which issued July 22, 1975 to the assignee of the present invention. Although the frame described in the above patent was designed to isolate the loader and skid steering forces of the vehicle from the drive components, no consideration was given to improving the operator's compartment of such vehicle or designing such frame for low clearance applications.

An early effort to change the profile of the skid steer loader is shown in U.S. Design Pat. No. 231,482, entitled "Self-Propelled Loader Vehicle" by James J. Bauer, issued Apr. 23, 1974, and assigned to the assignee of the present invention. This latter vehicle represents a scaled down version of a larger vehicle with some design modifications. The rear loader uprights and the boom arms project outwardly from the side frames to overlie the wheels of the vehicle, but an offset knee must be provided at the front end of the boom arms to accommodate power cylinders mounted on each loader arm for operating the loading bucket. Further, the operator enclosure becomes a fairly narrow, high enclosure, severely restricting side-to-side movement of the operator. Further, the load carrying capacity of such vehicle is severely limited since it remains primarily a scaled down version of a larger model.

The present invention represents a substantial innovative advance over the prior art in that a vehicle having a mid-range operating capacity (800 lbs. load capability) presents a wider and lower profile specially suited for low clearance, agricultural applications with little sacrifice in operating capacity, and substantial increase in operator compartment space.

Further substantial innovative advances have been made to accomplish the low profile of the present invention without sacrificing any substantial operating capacity and with marked improvement in operator comfort as summarized below.

SUMMARY OF THE INVENTION

The present invention comprises an improved main frame for a skid steer loader vehicle, the main frame comprising a center compartment partially defined by a pair of longitudinally extending, laterally spaced side beams. At the rear of the center compartment the main frame integrates a number of structural elements therefor to provide an acoustic enclosure for the engine for dissipating engine noises. Operator comfort is enhanced by substantially reduced noise levels for the loader in the operative mode. The improved acoustic enclosure for the engine reduces noise levels substantially, making the improved loader one of the quietest in the industry.

A cross plate is welded between the longitudinally extending laterally spaced side beams at respective rear bottom portions to form a partial floor at the rear of the main frame. A front wall having an inwardly turned top flange is secured between the side beams at respective front portions thereof. A transmission case presenting an elongated, substantially narrow, profile is mounted at a forward end of the side beams to form a partial floor at the front of the main frame for a center compartment of the main frame. Skid steering forces as well as the normal loader forces are largely isolated from the drive components associated with and contained in the case. The interior compartment formed receives the engine at a rear portion thereof. The main frame substantially surrounds the center compartment in laterally spaced relation.

Protruding from the case at respective front and rear ends thereof are the stub axles for the vehicle. Brackets mounted on the stub axles secure the case to the side beams of the main frame. Housed within the transmission case is the chain and sprocket drive for each set of wheels for the vehicle. Bolted to the outside of the transmission case are a pair of hydraulic motors which drive their respective set of wheels through the chain and sproket drive contained within the transmission case. The transmission case is oil filled to lubricate the drive for the vehicle. The mounting of the drive motors on the outside of the case permits a relatively long, narrow configuration for the case enabling a re-design of the operator's compartment which substantially increases the amount of leg room in the operator's space by permitting the operator to straddle the transmission case.

New fabrication methods for the transmission case include the manufacture of separate halves of the transmission case with the housings for the stub axles mounted in place for boring. The housings for the stub axles are bored as mounted on the transmission case with the axle shafts thereafter rotatably mounted in the housings, the separate halves of the transmission case being assembled after the axle housings are bored. This technique substantially reduces welding distortion produced by mounting pre-bored stub axles in place after the transmission case is assembled.

The chain drive for the vehicle has also been modified to improve the reliability of the vehicle. The new drive sprocket arrangement places the sprocket driving the rear wheel of each set of wheels at the outer end of the output shaft of the drive motor. The inner sprocket, mounted on the shaft between the outer sprocket and the drive motor, drives the front wheel of the set. Thus the rear chain offers substantial resistance to forces exerted on the vehicles under loading conditions. Torsional forces exerted on the vehicle under loading conditions are substantially greater for the front wheels. By mounting the chains for the front wheels on the inner sprockets moments for the cantilever mounted engine output shaftsare balanced, with the greater forces exerted on the front wheels equalized by the longer moment arms for the rear wheels.

The engine is rubber mounted on the bottom cross plate provided at the rear of the center compartment. Suitably secured to the engine are dual axially aligned variable displacement pumps which drive the motors mounted on the transmission case. Mounted between an operator compartment and the engine is a hydraulic reservoir for the pumps.

A pair of uprights are fabricated from plate material and are mounted at the rear of the side beams to structurally support loader arms mounted at upper pivotal mountings on each side. In the preferred embodiment the uprights are disposed outwardly of the main frame to lie behind the wheels mounted on the axles secured to the main frame of the vehicle. With the uprights of the loader vehicle lying behind the wheels of the vehicle, the loader arms, of necessity, must overlie the wheels of the vehicle. Accordingly, the front end of each loader arm has been arcuately proportioned to overlie the front wheels of the vehicle and to receive the outer end of the loader bucket thereon. To achieve this configuration the tilt cylinder for the loading bucket must be mounted inboard of the loader arms and the present invention incorporates a single mid-plane bucket tilt cylinder replacing the two cylinders mounted co-planar with the loader arms in the prior art.

The improved transmission case, as well as the outboard mounted loader arms, provides a wider, lower profile for the operator's compartment and permits a substantial reduction in the height of the overhead guard for the vehicle without reducing overall compartment height and a substantial increase in compartment width.

Further innovative advances have been achieved in the fabrication of the overhead guard of the vehicle. The overhead guard comprises stamped halves appropriately folded. When the required halves have been formed they are assembled and welded in place to provide a completed guard for the vehicle with minimal assembly time. Mounting means are provided for the overhead guard to absorb energy for protection under roll-over conditions and to vibrationally isolate the operator compartment under normal vehicle operating conditions.

The advantages recited above, as well as many others, will become more apparent to the reader in the detailed description set forth below when said description is viewed in conjunction with the drawings provided which are described as follows.

DESCRIPTION OF THE DRAWINGS

FIG. 10 is an exploded perspective view of the boom assembly of the vehicle, with the loader bucket omitted for clarity;

DESCRIPTION OF THE PREFERRED EMBODIMENT

Figure 1:
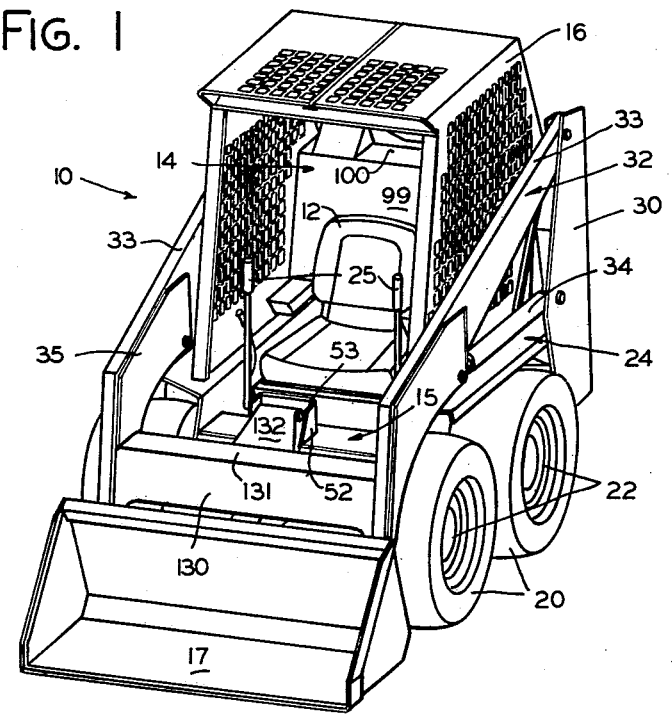
FIG. 1 is a perspective view of a skid steer loader constructed in accordance with the present invention.
Figure 2:
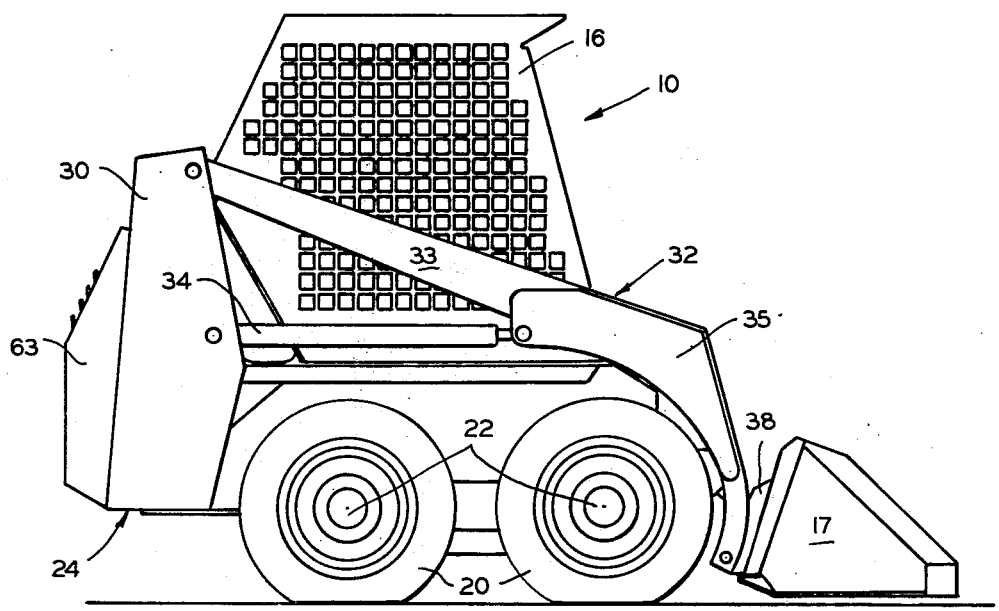
FIG. 2 is a side elevational view of the skid steer loader of FIG. 1.

FIGS. 1 and 2 show perspective and side elevational views of a rigid frame, skid steer end loader 10 having the general arrangement of an operator's seat 12 in the middle of the loader with an engine space 14 at the rear and a space 15 at the front for the operator's legs. The operator's compartment area is enclosed by an overhead framework or guard 16 providing protection against objects falling on to the operator from above, such as materials spilling over the rear of a bucket 17 when in a raised position. The overhead guard 16 also serves as a roll-over protective structure. Wheels 20 are mounted on stub axles 22 projecting outwardly from opposite sides of the vehicle body or main frame 24.

It will be understood by those acquainted with skid steer loaders that the vehicle 10 is propelled through a turning motion by driving the wheels 20 on one side at a different speed and/or direction than those on the other side, causing the vehicle to have great mobility or maneuvering in either the forward or reverse direction. The "steering" is controlled by the operator using a pair of levers 25, one on each side of the operator's seat 12, which may be moved independently in a fore and aft direction to cause the wheels 20 on that side of the machine to rotate at a speed and in a direction corresponding to the direction of the lever 25. For example, both levers 25 may be moved together in either a forward or rearward manner causing the loader to travel straightforward or back up at variable speeds depending on the position of the lever. Or, the operator may move the levers simultaneously but to a greater degree on one side than the other, thus causing the loader to execute a turn. Or, by pushing one lever in one direction and pulling the other in the opposite direction the loader is turned on its axis or spun around virtually in its own tracks.

At the rear is a pair of rear posts or uprights 30 having pivotally mounted at respective upper ends thereof a boom assembly 32. The uprights 30 are disposed outwardly of the vehicle body 24 and lie behind the wheels 20 provided on either side of the vehicle. A pair of lift arms 33 of the boom assembly 32 overlie the wheels 20 on each side of the vehicle 10 and extend forwardly alongside the operator's compartment and project arcuately downwardly at the front of the machine to overlie the front of the wheels 20. Mounted at the forward end of the lift arms 33 is the bucket 17. A boom lift cylinder 34, one on each side, is pivotally mounted at the rear end to the upright 30 and at the rod end to a pair of laterally spaced gusset plates 35 mounted on the lift arm 33. A bucket tilt cylinder 37 (FIG. 9) is suitably mounted between the front ends of the loader arms 33 for pivotal movement at the cylinder end and at the rod end to a bucket mounting attachment 38 which pivotally mounts the bucket 17 to the arms 33 at the point 39. By means of foot pedals provided in space 15 or auxiliary controls (not shown) associated with the levers 25 the operator is able to control independently the extension and retraction of the lift and tilt cylinders 34, 37 when working with the machine. It will be understood that while an end loader is depicted in the drawings, the machine may be outfitted with various attachments other than the bucket 17.

Figure 3:
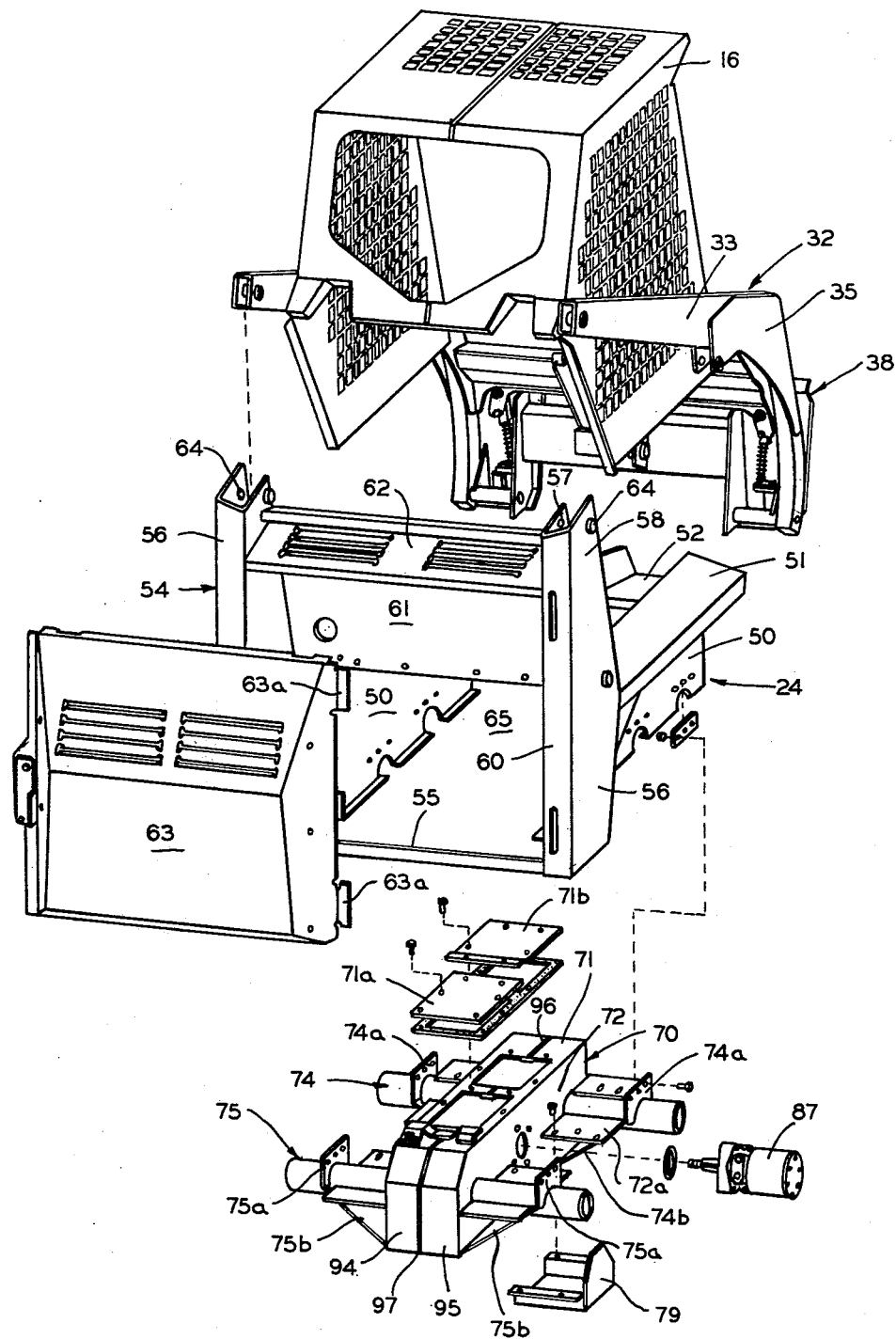
FIG. 3 is an exploded perspective view of the main frame of the skid steer loader showing the major structural elements of the vehicle, as viewed from the rear thereof.

Referring now to FIG. 3 main frame 24 of the vehicle 10 includes a pair of longitudinally extending, laterally spaced side beams 50 having outwardly directed upper flanges 51 which overlie the wheels 20 and serve as protective fenders for the vehicle. The side beams 50 are joined at the front by front wall member 52 and at the rear by a post or upright fabrication 54 including a bottom crossmember 55. The upright fabrication 54 includes a pair of uprights 56, formed of plate material, wider at the bottom and tapering upwardly toward the top. Each upright 56 comprises a pair of laterally spaced side portions 57 and 58, joined by a vertically extensive rear portion 60, the inner side portion 57 abutting the side beam 50, the side portion 58 spaced outwardly therefrom to provide a channel therebetween. Front crossmember 61 and top crossmember 62 extend between uprights 56 at the front and top thereof and a door 63 extends between uprights 56 at the rear thereof. A pivotal mounting location 64 is provided at the upper end of each upright 56 for each of the lift arms 33 of the boom assembly 32. The uprights 56 are mounted on the outside of the side beams 50 and are thus disposed outwardly of a center compartment 65 provided in the main frame 24.

The center compartment 65 of the main frame 24 is largely open and carries a sub-frame or transmission case 70 at a lower front portion thereof, the case 70 having front and rear stub axles 74, 75 mounted thereon, with respective flanges 74a, 75a laterally spaced from the case 70 being welded to outer ends of the stub axles 74. Gusset plates 74b, 75b (FIG. 3) are provided between the flanges 74a, 75a and a lower edge of the case 70. The flanges 74a, 75a are used to secure the case 70 to the side walls 50 of the main frame 24.

The main frame 24 further includes the boom assembly 32 mounted on uprights 56 at pivotal mounting locations 64. The overhead guard 16 is mounted on flanges 51 of side beams 50 of the main frame 24.

Referring now to structural elements of the main frame 24:

Transmission Case

Figure 4:
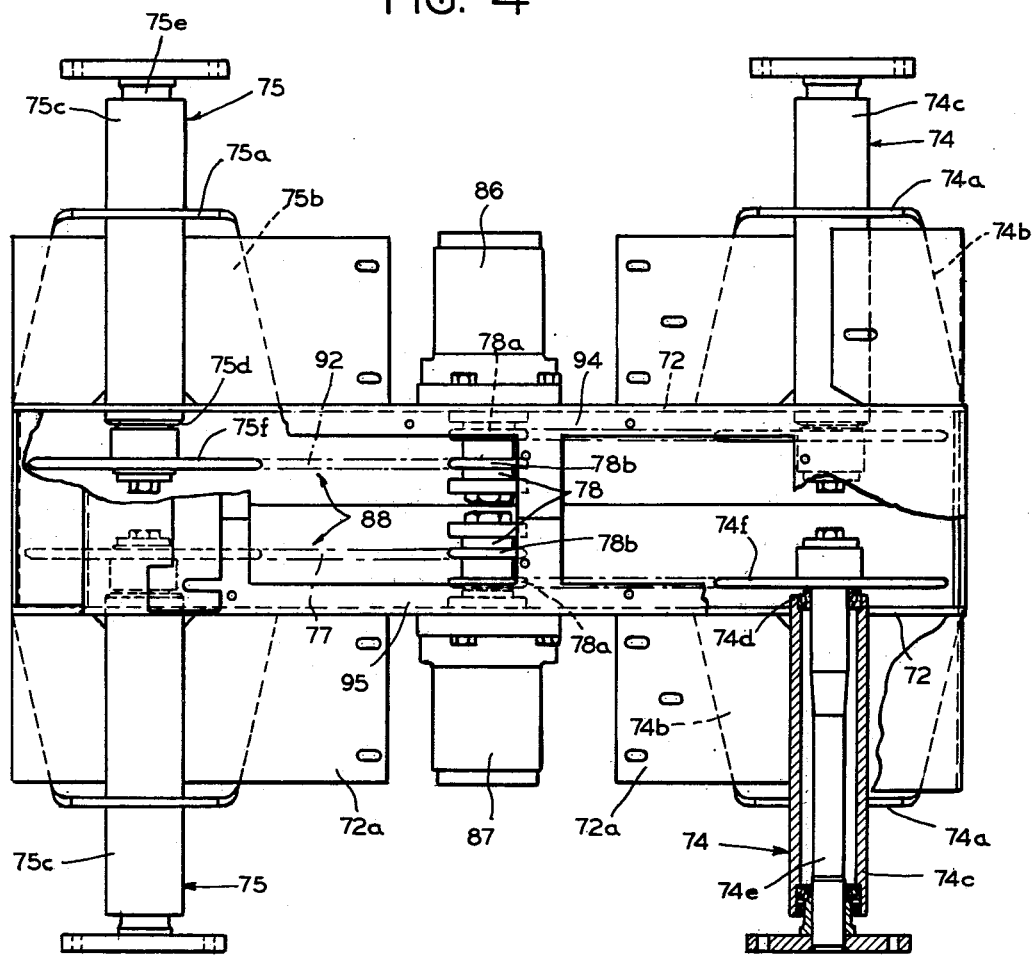
FIG. 4 is a top plan view of the transmission case shown at the bottom of FIG. 3, the case having portions removed for clarity.
Figure 5:
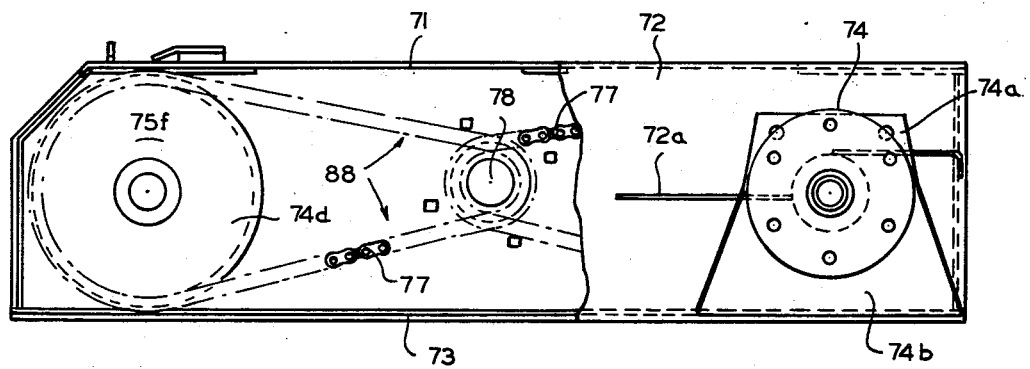
FIG. 5 is a side elevational view of FIG. 4, with portions of the case being removed for clarity.
Figure 6:
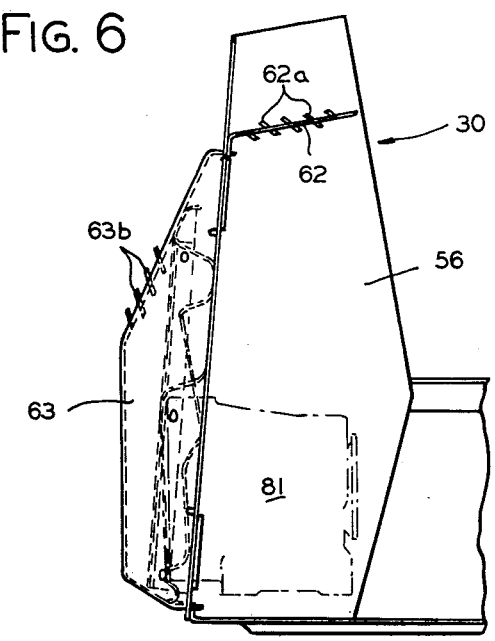
FIG. 6 is a partial side elevational view of the main frame shown with the rear acess door of the loader mounted in place.
Figure 7:
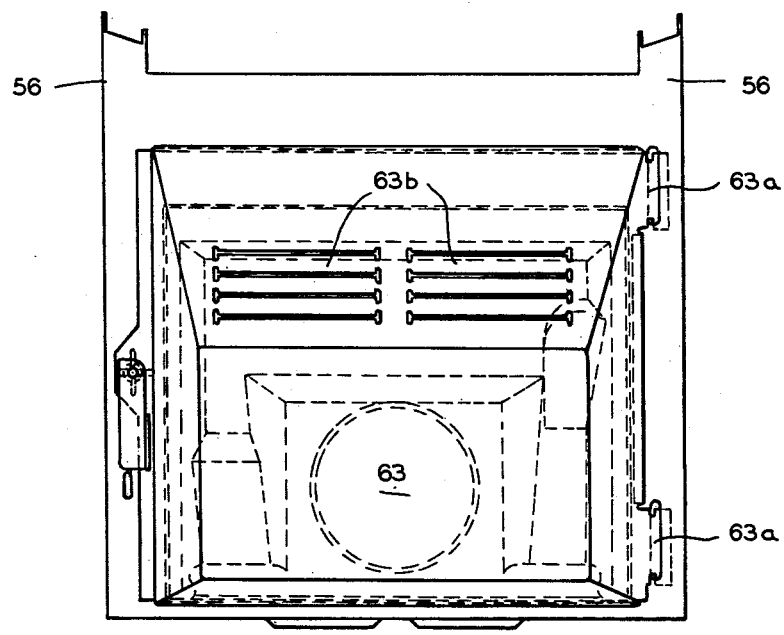
FIG. 7 is an end view of the main frame showing the door in FIG. 6.

Referring now to FIGS. 3, 4 and 5, the sub-frame or transmission case 70 comprises top wall 71, side walls 72 and bottom wall 73. Front and rear stub axles 74, 75 project from opposite sides of the case 70 adjacent each end. Axle housing 74c, 75c are welded to the side walls 72 of the case 70 and open at respective inner ends 74d, 75d into the compartment 70. Stub axle shafts 74e, 75e are rotatably journalled in axle housing 74c, 75c and carry at their inner ends wheel sprockets 74f, 75f which are connected by chains 77 to drive sprockets of a motor output shaft 78. In FIG. 3, it can be seen that the transmission case 70 is divided into halves 94 and 95, the halves 94 and 95 being welded together along a peripheral seam shown as 96, 97 at top wall 71 and end wall 76 of the transmission case 70. The front and rear axle housings 74c, 75c are welded to the separate halves of the transmission case prior to assembly. The axle housings are then bored prior to assembly and the halves 94, 95 are then welded together. Openings in the top walls 71 provide access to the interior of the case 70 with axle shafts 74e, 75e rotatably journalled in the axle housings 74c, 75c therethrough. The chain and sprocket drives for the vehicle are then installed in place. Cover plates 71a and 71b are then mounted on the top wall 71 to complete assembly of the case 70.

The transmission case 70 presents an elongated substantially narrow profile, with side walls 72 laterally displaced from the side beams 50 of the main frame 24 when the case 70 is mounted in place. Lateral flanges 72a, having longitudinal edges secured to side walls 72 are mounted on the front and rear stub axles 74, 75 to provide floor plates for the bottom of the operator's compartment 14, enabling an operator seated in compartment 14 to straddle the case 70.

The hydraulic drive means for the vehicle 10 comprises first and second variable displacement pumps 85 (FIG. 8) driven on a common shaft connected to the engine drive shaft. First and second pumps 85a, 85b are mounted on an upper surface of top wall 71 of the case 70. Mounted on respective outer surfaces of opposite side walls 72 of the case 70 are first and second hydraulic motors 86, 87. The mounting of hydraulic motors 86, 87 is best shown in FIG. 4. Each hydraulic motor has an output shaft 78 extending into the transmission case which carries at an inner end thereof drive sprockets 78a and 78b. The drive sprockets 78a and 78b comprise portions of chain and sprocket drives 88 provided for each set of wheels 20 and carried in the transmission case 70. Endless chains 77 connect drive sprockets 78a, 78b to the wheel sprockets 74f, 75f carried on the inner ends 74d, 75d of the stub axle shafts 74e, 75e of the front and rear stub axles 74, 75. Drive sprocket 78a lies adjacent the side wall 72 of the transmission case 70. A first endless chain 77 connects the drive sprocket 78a to the front wheel sprocket 74f carried at the inner end 74d of front axle 74. Drive sprocket 78b, carried at the outer end of the output shaft 78, is connected by a second endless chain 77 to the wheel sprocket 75f carried at the inner end 75d of rear axle 75. The relative position of the sprockets 78a, 78b balances the moments of force exerted on the output shaft 78 by the drives for the front and rear wheels of the vehicle.

No additional gear reduction means such as those disclosed in U.S. Pat. No. 3,895,728, supra, are required. Hydraulic motors 86, 87 mounted on the outside of the transmission case are of the rolling vane Gerotor type which possess inherent gear reduction capability. Any additional gear reduction required is achieved by the difference in the size of the drive sprocket 78 and the wheel sprockets 74f, 75f for the chain and sprocket drives 88. First and second pumps 85a, 85b are operatively connected by means of hydraulic hoses to the first and second hydraulic motors 86, 87 mounted on the outside of the transmission case 70.

It will be appreciated that each of the first and second variable displacement pumps 85a and 85b include a circular array of pistons and cylinders which revolve against swash plates which may be tilted by means of a control linkage to vary the displacement of the pumps 85a, 85b. The control linkage provided for the variable displacement pumps 85a, 85b may be like that shown in application D-2873 entitled "Skid Steered Tractor Vehicle Combined Steering Lever and Auxiliary Control with Self-Centering Mechanism" filed Nov. 26, 1975 and assigned to the assignee of the present invention.

Engine Enclosure

Figure 8:
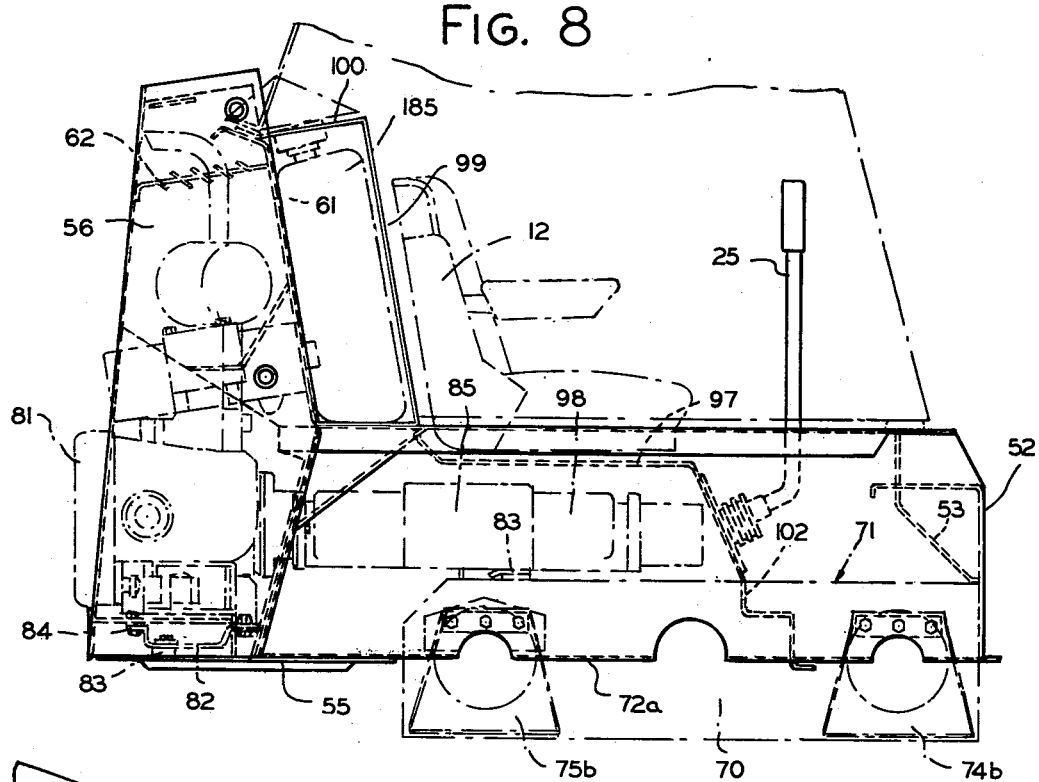
FIG. 8 is a side elevational view of the main frame of the skid steer loader with certain elements associated with the operator's compartment added for clarity.

As best seen in FIG. 8, mounted at the rear of the center compartment 65 of the main frame 24 is an engine 81 mounted on the rear crossplate 55. The engine 81 is secured to channel shaped mounting bracket 82, bracket 82 having rubber mounting locations 83 for the engine 81. Fasteners 84 secure the engine 81 to the rubber mount 83 on the crossbar 55. At the forward end of the engine 81, the engine is connected to a dual, variable displacement hydraulic pump 85 by the engine shaft (not shown). The forward end of the pump is mounted on the top wall 71 of the transmission case 70 at forward mount 83. Uprights 56 and bottom, front and top crossmembers 55, 61 and 62 and the rear door 63, partially enclose the engine 81. Floor plates 72a are joined to a connecting closure 79 secured between floor plates 72a to completely enclose the lower front portion of compartment 65. A seat pan 97 which is secured to flanges 51 of the main frame 24 to extend between upper edges of side beams 50 forms a top portion of an enclosure 98 for the compartment 65. A seat pan extension member 99 extends upwardly from the rear edge of the seat pan 97, terminating at a rearwardly directed upper flange 100, the flange 100 secured to an upper extension of the upright front cross member 61. Front panels 102 extend between the seat pan 97 and the case 70, to close the forward end of the enclosure 98, with outer front panels 102 joining the case at side flanges 72a and an inner front panel 102 joining the case 70 at top wall 71.

Louvers 62a are provided in top crossmember 62 to dissipate engine noises toward the rear end away from the operator compartment to minimize engine noise levels. Rear door 63 mounted on one upright 56 and locked on the opposite upright 56, encloses the rear end of the engine 81. Hinges 63a are inserted into openings provided in the first upright 56 to support the door 63. The door 63 also has louvers 63b to admit entering air to the carburetor of the engine. Uprights 56, crossmembers 55, 61 and 62, rear door 63, seat pan 97, front panels 102, the transmission case 70 and floor plates 72a and closure 79 comprise the enclosure 98 designed to reduce engine and transmission noise.

Boom Structure

Figure 9:
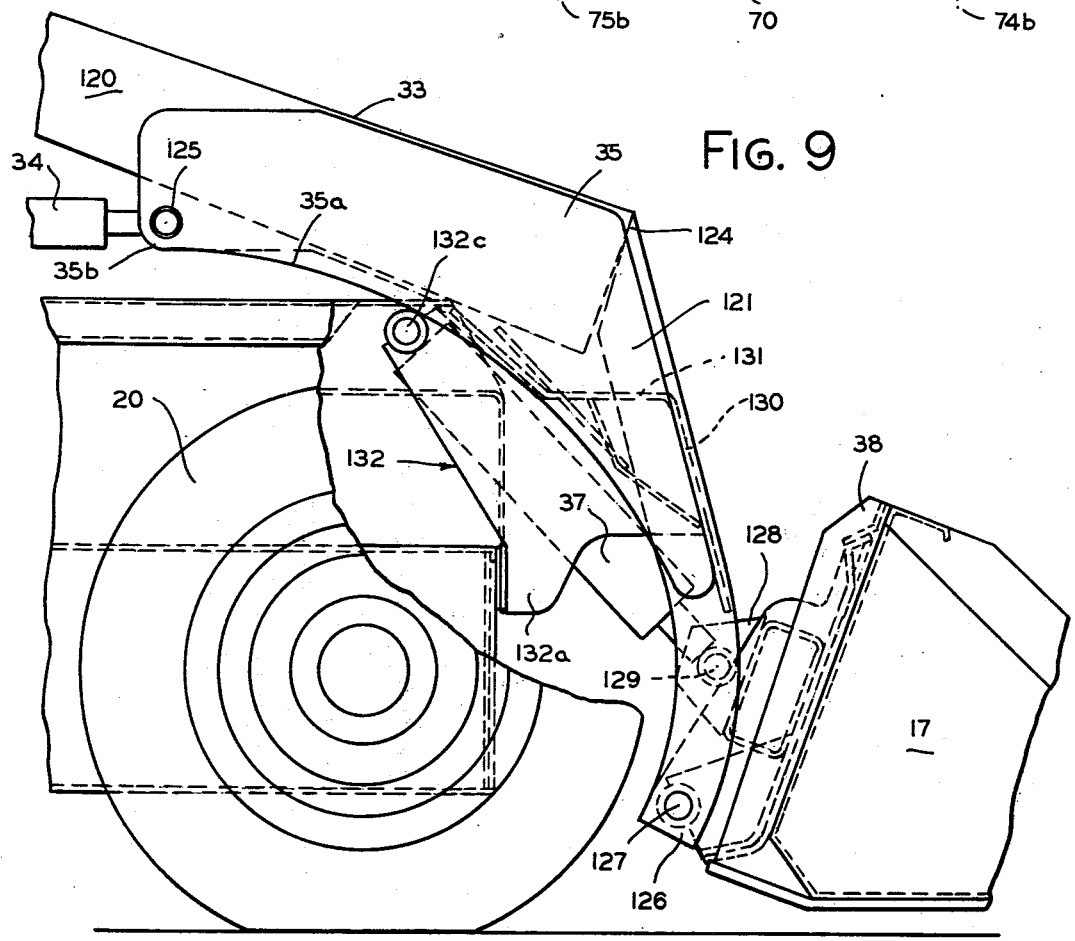
FIG. 9 is an enlarged partial side elevational view of the front end of the loader shown in FIG. 2, with portions of the loader body and wheels being shown in phantom.

Referring now to FIGS. 9 and 10, the boom assembly 32 is secured to the uprights 30 at pivotal connections 118. The boom assembly 32 comprises a pair of boom arms 33 each arm having a longitudinal portion 120 having a box-shaped cross-section which slopes downwardly from the pivotal connection 118 and increases in section from rear to front. The member 120 has welded thereto at its forward end an arcuate portion 121 rectangular in cross-section which projects downwardly to extend forward of the front wheel 20 of the vehicle 10, with both portions 120, 121 of the boom arm 33 overlying the wheels 20 of vehicle 10. Corner gusses plates 35 are provided on both sides of the juncture of the members 120 and 121 to reinforce joint 124 therebetween. Corner plates 35 each have a curved lower edge 35a which substantially follows the contour of the front wheel 20 of the vehicle 10 as best seen in FIGS. 2 and 9. Lower rear portions 35b of the plates 35 project below the longitudinal portion 120 of the lift arm 33. The corner plates 35 are provided on either side of a joint 124 between the members 120, 121 and have mounted therein at the rear portions 35b thereof a pivotal mounting means 125 for receiving the rod end of the boom lift cylinder 34.

The cylinder end of the boom lift cylinder 34 is secured to a lower end of the upright 30. Provided at a lower end of the forward member 121 of the boom arm 32 is a pivotal mounting means 126 which provides a pivotal connection 127 at opposite lower ends of an implement attachment device 38 similar to that shown in U.S. Pat. No. 3,672,521, issued June 27, 1972, entitled "Quick Attachment Device" and assigned to the assignee of the present invention. Reference may be had to the above-mentioned patent for a more detailed description of the attachment device. Provided at a midportion of the device 38 is a mounting bracket 128 providing a pivotal connection 129 thereon. A crossmember 130 having a rearwardly directed top structural flange 131 is secured between lower ends 121 of opposite boom arms 33. The member 130 is provided for lateral stability of the boom assembly 32. Mounted at the midpoint of the crossmember 130 is a tilt cylinder bracket 132. The bracket 132 comprises a pair of laterally spaced plates 132a structurally joined to a bottom plate 132b. A pivotal connection 132c is provided on the plates 132a at a rear upper end of the bracket 132. The cylinder end of the bucket tilt cylinder 38 is secured to pivotal connection 132c. The rod end of the cylinder 38 is connected to the mounting bracket 128 of the device 38 at pivotal mounting means 129. A recess 53 (FIG. 1) aligned with the transmission case 70 at the front thereof provided in the front wall member 52 of the main frame 24 receives the cylinder bracket 132 when the boom assembly 32 is in a lowered position.

Overhead Guard

Figure 13:
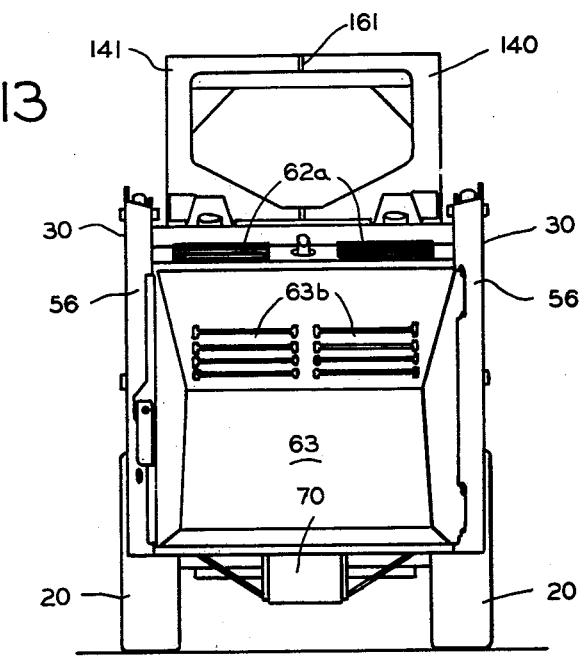
FIG. 13 is an end view of the vehicle, showing the assembled overhead guard of FIG. 12.
Figure 11:
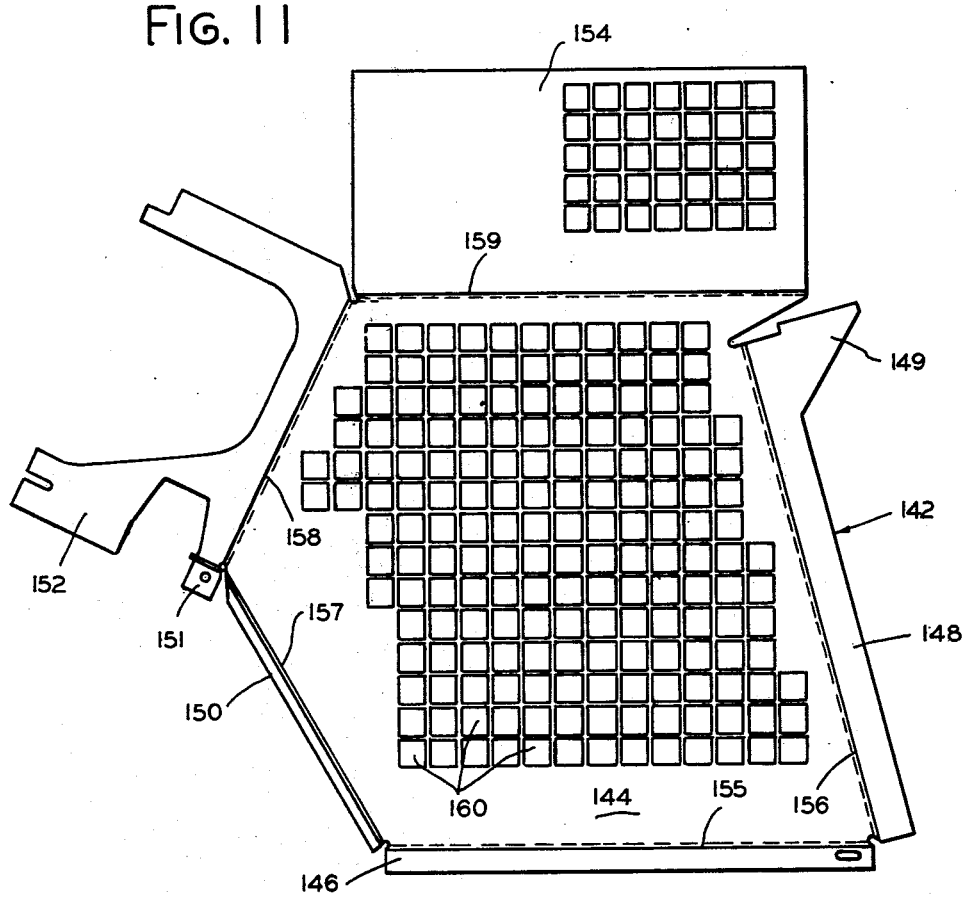
FIG. 11 is a top plan view of a sheet from which a portion of the overhead guard is fabricated.
Figure 12:
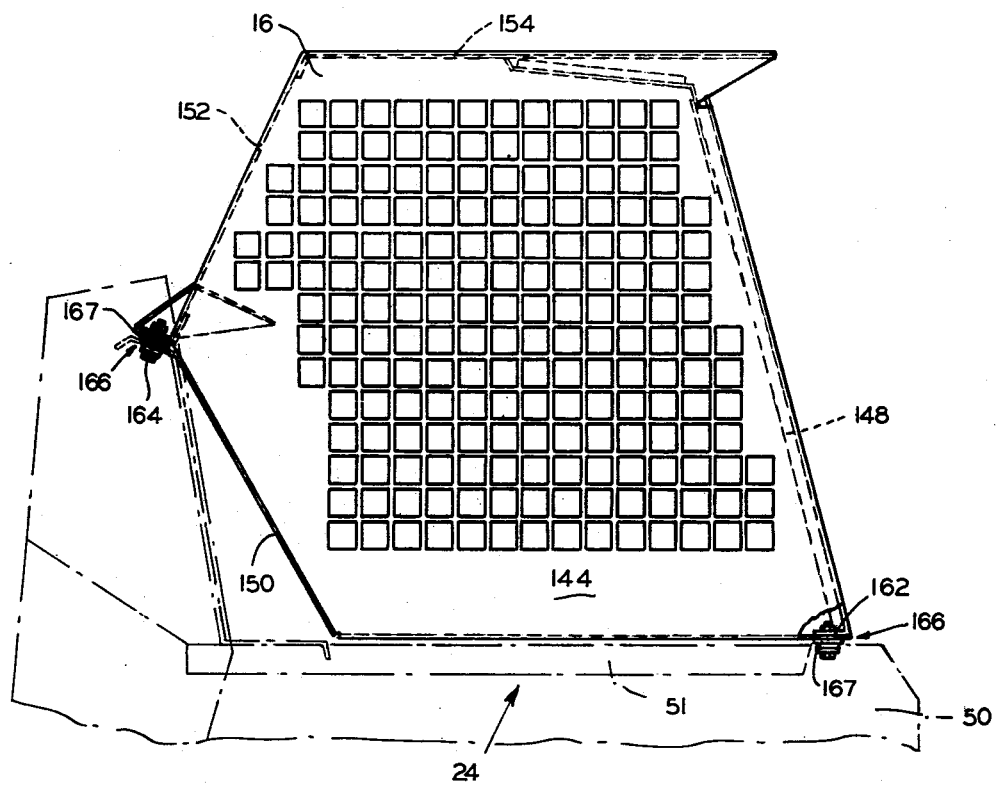
FIG. 12 is a side elevational view of the overhead guard of the vehicle, a portion of the vehicle main frame being shown in phantom to indicate mounting locations for the overhead guard.

Referring now to FIGS. 11, 12 and 13 the overhead guard 16 is a sheet metal fabrication comprising mated halves 140 and 141 (FIG. 3). Since the halves 140 and 141 are symmetrical about a vertical centerline for the vehicle, the fabrication technique discussed below will be directed only to the half 140. The vehicle overhead guard half 140 comprises a sheet metal fabrication 142 including a main sidewall portion 144, a bottom mounting flange 146, front support flange 148, a rear support flange 150, a rear mounting tab 151, a rear wall portion 152 and a top wall portion 154. Breaking lines 155, 156, 157, 158 and 159 are provided between the main sidewall portion 144 and respective portions 146, 148, 150, 152 and 154. The portions 146, 148, 150, 152 and 154 are folded inwardly along their respective break lines to form the symmetric half fabrication 140 of the overhead guard 16. The mounting tab 151 is folded outwardly from the rear wall 152 of the fabrication 140 to provide a mounting plate for the overhead guard 16. Prior to folding, the sheet 142 is stamped to provide cutout portions 160 therein, forming a protective grid for top and side portions of the guard to limit intrusion of foreign matter into the operator's compartment while providing sufficient operator visibility of the work environment. The half 141 comprises a sheet metal fabrication similarly cut, stamped and correspondingly folded to produce the symmetric left hand portion 141 shown in FIG. 13. The halves 140 and 141 are secured together along a center seam 161 provided by welding sections 140, 141 together. The front support flange 148 also includes a gusset portion 149 in an upper corner of the overhead guard for additional reinforcement and support. The guard is mounted on the side flanges 51 of the main frame 24 at front mounting sites 162 and rear mounting sites 164, best seen in FIG. 12. Unique energy absorbing qualities are provided for the overhead guard 16 by mounting assemblies 166 provided at mounting sites 162 and 164. Mounting assemblies 166 include rubber cushions 167 mounted at sites 162 and 164 which substantially improve the vehicle's ability to withstand forces exerted thereof under roll-over conditions, and vibrationally isolate the operator's compartment from the main frame 27 of the vehicle 10 under normal operating conditions.

The machine's roll-over capability is best understood by a consideration of test results obtained for SAE test Nos. JT-394A and J-1040 and the SAE Test Manual is hereby incorporated by reference for a complete description of the testing method. Test results for the three types of loading required under the above-named tests are as summarized below:

1. Energy absorption capability — 22,179 inchpounds.
2. Horizontal load capability — 2,842 pounds.
3. Vertical load capability — 6,000 pounds A comparison of the above test results with SAE requirements reveals that the present vehicle, having an overhead guard mounted thereon which was designed and mounted as described above exceeded test requirements for a 6,000 pound vehicle. The gross vehicle weight of the skid steer loader of the present invention is slightly more than 3,000 pounds. Thus, the design of the present overhead guard substantially exceeds test requirements.

Hydraulic System

Figure 15:
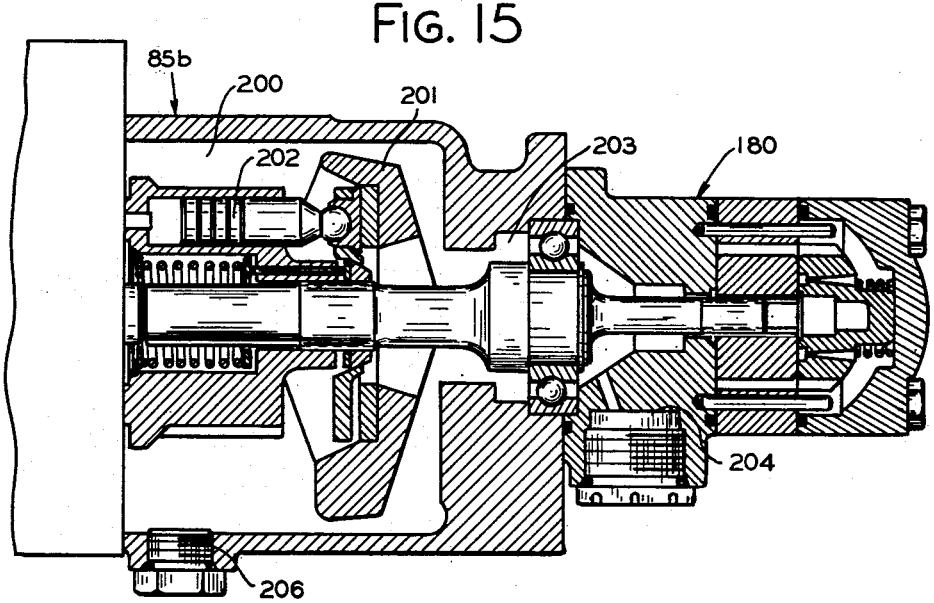
FIG. 15 is a partial sectional view of the pump shown in FIG. 14.
Figure 14:
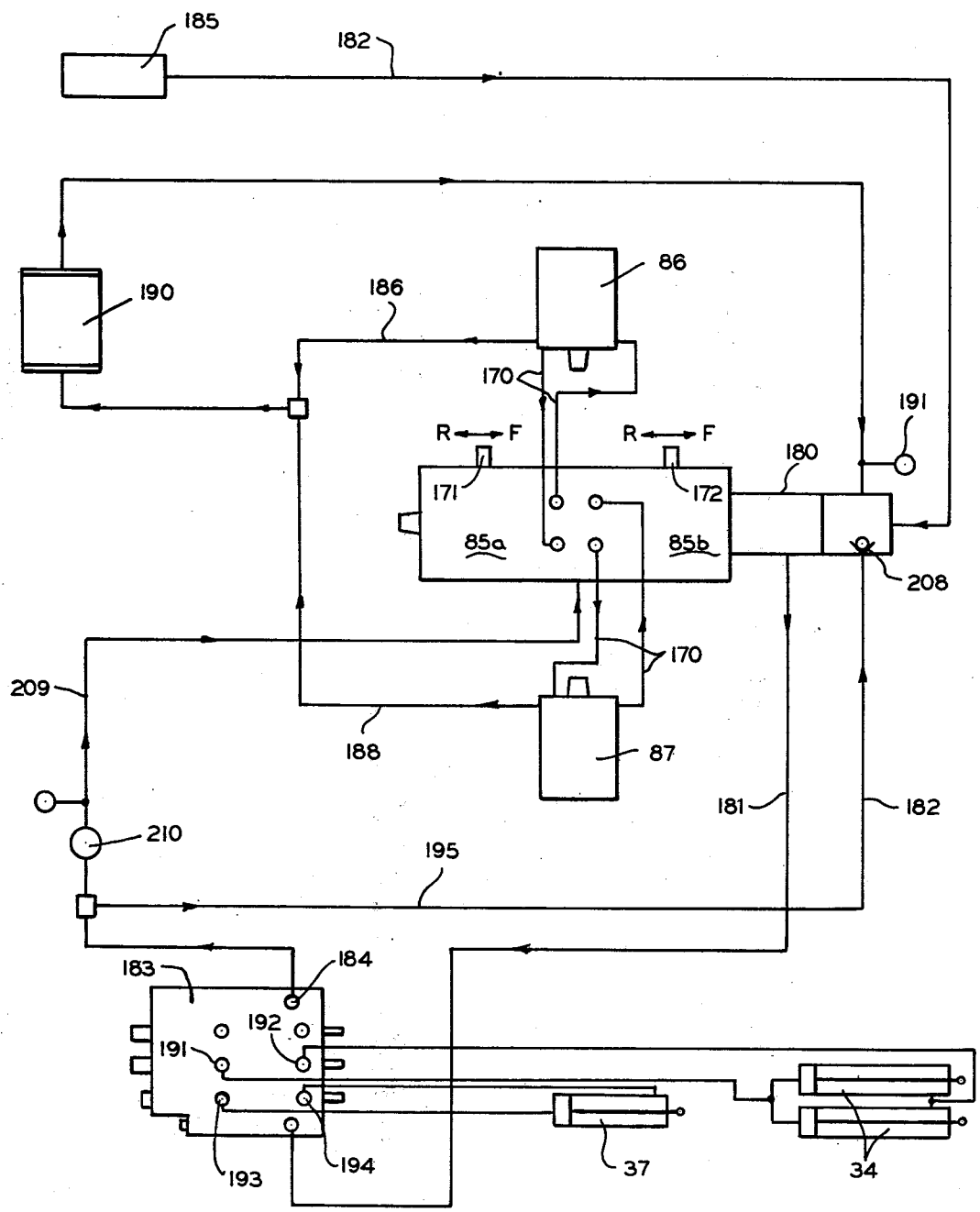
FIG. 14 is a schematic of the hydraulic drive system of the skid steer loader.

Referring now to the hydraulic system driving the vehicle, please see FIGS. 14 and 15. First and second variable displacement pump units 85a, 85b are driven on a common shaft connected to the engine drive shaft. First and second pumps 85a, 85b are operatively connected by hydraulic lines 170 to first and second hydraulic motors 86, 87 mounted on the transmission case of the vehicle.

Each of the first and second variable displacement pumps 85a, 85b includes a circular array of pistons and cylinders which revolve against swash plates which may be tilted by means of a control linkage (not shown) connected to respective controls 171, 172 on the first and second pumps 85a, 85b to vary the displacement of the pumps 85a, 85b. The control linkage is connected to control levers 25 on each side of the operator's seat 12 such that movement of either the right or left lever 25 will cause movement of control 171 or 172 so as to change the angle of the swash plate of either the pump 85a or 85b depending on the movement of the vehicle desired. It is understood of course, that the engine 81 will be driven at a constant rpm ordinarily and variable speed is attained by manipulation of the swash plate.

An implement pump 180 is axially aligned with the pumps 85a, 85b and is operatively connected by means of the hydraulic hoses 181 and 182 to a valve bank 183 which controls the lift and tilt cylinders 34, 37 connected by a linkage (not shown) such as described in application D-2783, supra, to the control lever 25. A separate hydraulic reservoir 185 (FIG. 4) is provided to supply fluid as needed for the hydraulic components of the vehicle. Each of the motors 86, 87 are provided with bleed-off lines 186, 188 directing hydraulic fluid to a cooler 190. The fluid is carried from the cooler to the inlet portion of the pump 180.

Referring further to the valve bank 184, valve ports 191, 192 operate the lift cylinders 34 and valve ports 193, 194 operate the tilt cylinder 37. More fluid is required to extend the cylinders 34, 37 than to retract them. Accordingly, additional fluid is drawn into the pump 180 from the reservoir 185 through lines 182. When the cylinders are retracted an excess of oil is available. The excess oil is carried back to the reservoir through lines 195 to by-pass valve 208 through lines 182. Line 209 carries oil from outlet 184 of valve bank 183 through filter 210 to main pumps 85*a* and 85*b*.

The pump 85*b* and implement pump 180 are shown in more detail in FIG. 15. The pump 85*b* comprises a swash plate 201 mounted in the pump section 200. A series of revolving pistons 202 engage the face of the swash plate 201 in the pump section 200. Pistons 202 are caused to revolve by driving the engine input shaft and the displacement of each piston per revolution may be adjusted by varying the angle of tilt of the swash plate 201. It may be pointed out that the position of swash plate 201 shown in FIG. 15 is neutral, with no piston displacement per revolution. Reverse and forward displacement results when swash plate 201 is tilted. The output of pump unit 85*b* is directed to hydraulic motor 87 to cause rotation of the output shaft in either the forward or the reverse direction.

Normally the output shafts of pumps 85*b* and 180 are axially aligned with an oil seal therebetween to isolate the pumps from each other. Excess fluid passes from pump 85*b* to external piping carrying the fluid to the pump 180. In the present invention, pump inlet port 203 is provided between pumps 85 and 180 by removing the shaft oil seal therebetween, thus eliminating the need for fluid flow externally of the case of hydrostatic pump 85*b* to inlet port 204 of hydraulic auxiliary pump 180. Thus external piping from excess oil drain port 206 of pump 85*b* to inlet port 204 of pump 180 can be eliminated.

The vehicle shown and described thus presents an improved vehicle having a substantially lower profile, particularly suitable for low clearance applications. While only a single embodiment of our invention has been described in detail, it will be understood that the detailed description is intended to be illustrative only and that various modifications and changes may be made to our invention without departing from the spirit and scope of it, therefore the limits of the invention should be determined from the attached claims.

We claim:

1. A skid steer loader vehicle and vehicle main frame in combination, the main frame comprising laterally spaced, longitudinal extending side beams on opposite sides of the vehicle centerline, crossmembers mounted between the side beams at opposite ends thereof, said members partially enclosing a center compartment, said side beams having outwardly disposed flanges overlying opposite pairs of side wheels for the vehicle, a pair of upright members mounted on respective side beams at the rear thereof, the upright members disposed outwardly of the side beams and projecting upwardly from adjacent the rear of each side beam, a rear crossmember provided between an upper end of the uprights, and an upper enclosure mounted on the main frame and overlying the center compartment of the vehicle, the enclosure disposed forwardly of the uprights of the vehicle, the enclosure generally of two-piece construction and including side, top and rear walls and an open front wall providing entry to the enclosure, the side walls terminating in mounting surfaces comprising inwardly directed flanges overlying the side beam flanges and the rear wall including outwardly directed tabs engaging the rear cross member, the upper enclosure comprising an overhead guard defining an operator's compartment for the vehicle and the side, top and rear walls comprising a grid which physically isolates the operator from movable structural elements of the vehicle, energy absorbing mounting means provided on the main frame between the mounting surfaces of the overhead guard and the mounting surfaces of the frame to vibrationally isolate the overhead guard from the vehicle, and mounting locations for the upper enclosure provided on the side flanges of the side beams and at opposite ends of the rear crossmember for mounting the enclosure on the vehicle.

2. The combination as claimed in claim 1 wherein the side and top walls of the enclosure include grid portions permitting lateral and overhead visibility to the operator enclosed therein.

* * * * *